June 10, 1952  E. L. BURNETT  2,600,047
BED LEVELER FOR FUNERAL CARS AND THE LIKE
Filed May 27, 1949  2 SHEETS—SHEET 1

INVENTOR.
Elton L. Burnett
BY
Oldham & Oldham
Attorneys

June 10, 1952  E. L. BURNETT  2,600,047
BED LEVELER FOR FUNERAL CARS AND THE LIKE
Filed May 27, 1949  2 SHEETS—SHEET 2
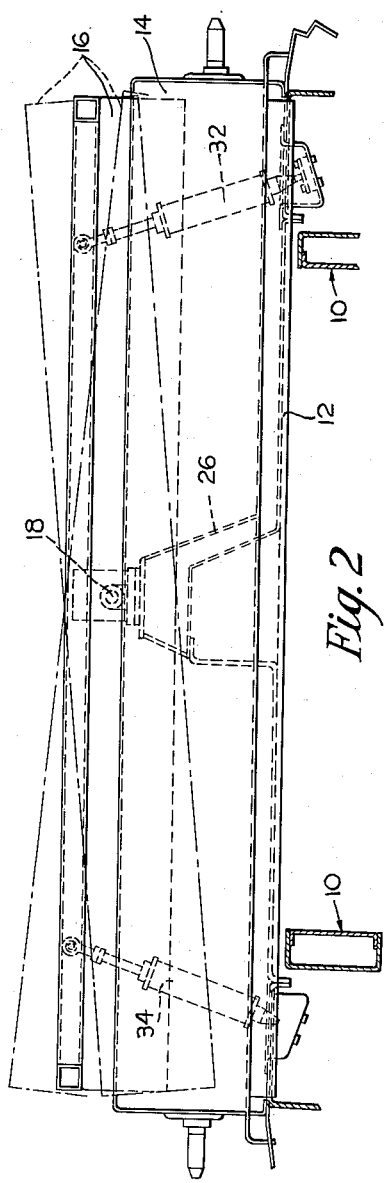
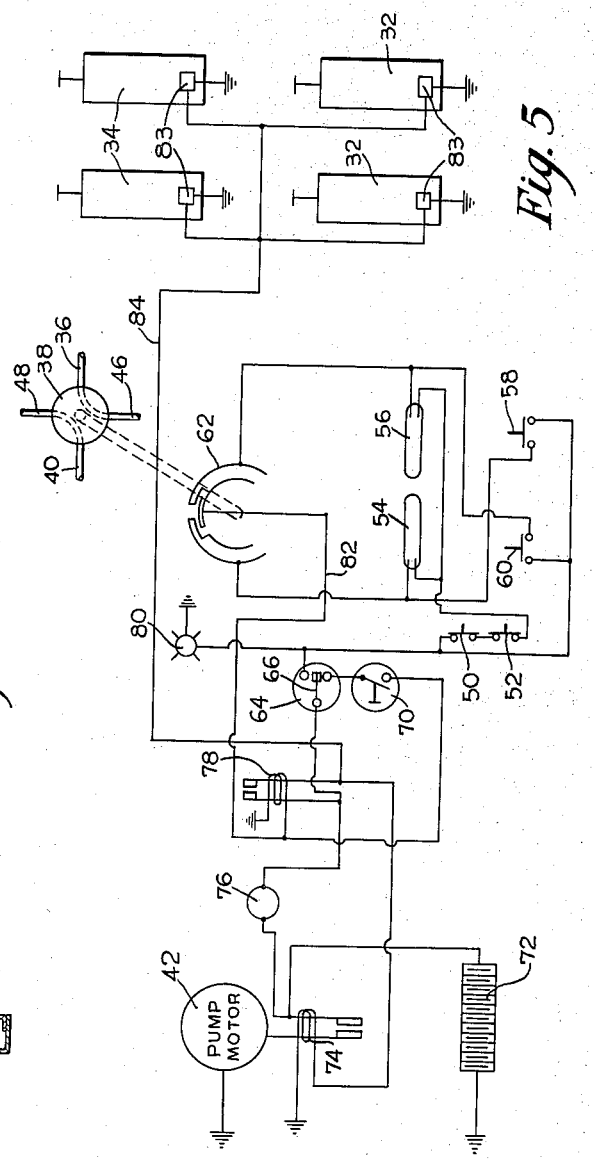
INVENTOR.
Elton L. Burnett
BY
Oldham & Oldham
Attorneys Patented June 10, 1952

2,600,047

UNITED STATES PATENT OFFICE 2,600,047

BED LEVELER FOR FUNERAL CARS AND THE LIKE

Elton L. Burnett, Loudonville, Ohio, assignor to The Flexible Company, Loudonville, Ohio, a corporation of Ohio Application May 27, 1949, Serial No. 95,720

8 Claims. (Cl. 296—16)

This invention relates to leveling means for use in association with the bed or floor of a funeral car or the like, and, more particularly, is concerned with an electric-hydraulic system for rendering the support of a casket, for example, horizontal even though the vehicle carrying the same is tilted, and is specifically adapted for use with side and/or rear opening funeral cars.

It has been known heretofore to provide funeral cars and the like with side openings for facilitating the introduction or removal of a stretcher, casket, or the like, and to provide some means for leveling the casket or other support in a lateral direction even though the crown of the road or other conditions position the wheels on one side of the vehicle higher than the wheels on the other. However, such known leveling means and mechanisms have either been manual in operation, and thus time consuming and objectionable, or have been noisy or jerky in operation, or have been relatively complicated and expensive in character requiring high initial costs or maintenance problems.

It is the general object of my invention to avoid and overcome the foregoing and other difficulties of and objections to known devices of the indicated type by the provision of an improved, relatively simple, fool-proof, power-operated apparatus for leveling a casket or other support in a funeral car or similar vehicle.

Another object of my invention is to provide smooth, strong and quiet electric-hydraulic means for laterally leveling a table movable through a side opening in a funeral car.

Another object of my invention is the provision of mechanism of the character described including lever controlled means for automatically effecting a leveling or return movement of a support mount in a vehicle, together with manually operable means for overriding the automatic control means if desired.

The foregoing objects of my invention, and other objects which will become apparent as the description proceeds, are achieved by the provision of a bed leveler for funeral cars and the like comprising spaced pivotal means supporting a mound for leveling movement about a central longitudinal axis on a vehicle floor, hydraulic cylinders securing opposite sides of the mound in association to the vehicle floor, an electric motor, a hydraulic pump driven by the motor, and means for connecting the pump to the cylinders to effect leveling operation of the mound. Preferably the hydraulic cylinders have electrically operated valves associated therewith for locking fluid in them when adjusted, and a combined hydraulic fluid valve and electric switch is employed for simultaneously opening the electrically operated valves, for starting the motor, and for directing the fluid from the pump to certain hydraulic cylinders and removing it from others to effect a leveling of the mound. The combination also preferably includes mercury switch means for automatically shutting off the motor and locking the hydraulic cylinders when the leveling operation is completed, and return switch means for overriding the mercury switch means when the combined valve and switch is moved in the opposite direction. Manual control means may also be connected to override the mercury switch and return switch means if desired.

For a better understanding of my invention, reference should be had to the accompanying drawings, wherein:

Fig. 2 is an enlarged end elevation of the apparatus of the invention and showing the vehicle frame and floor in transverse section;

Fig. 5 is a schematic wiring diagram of the apparatus.

Figure 1:
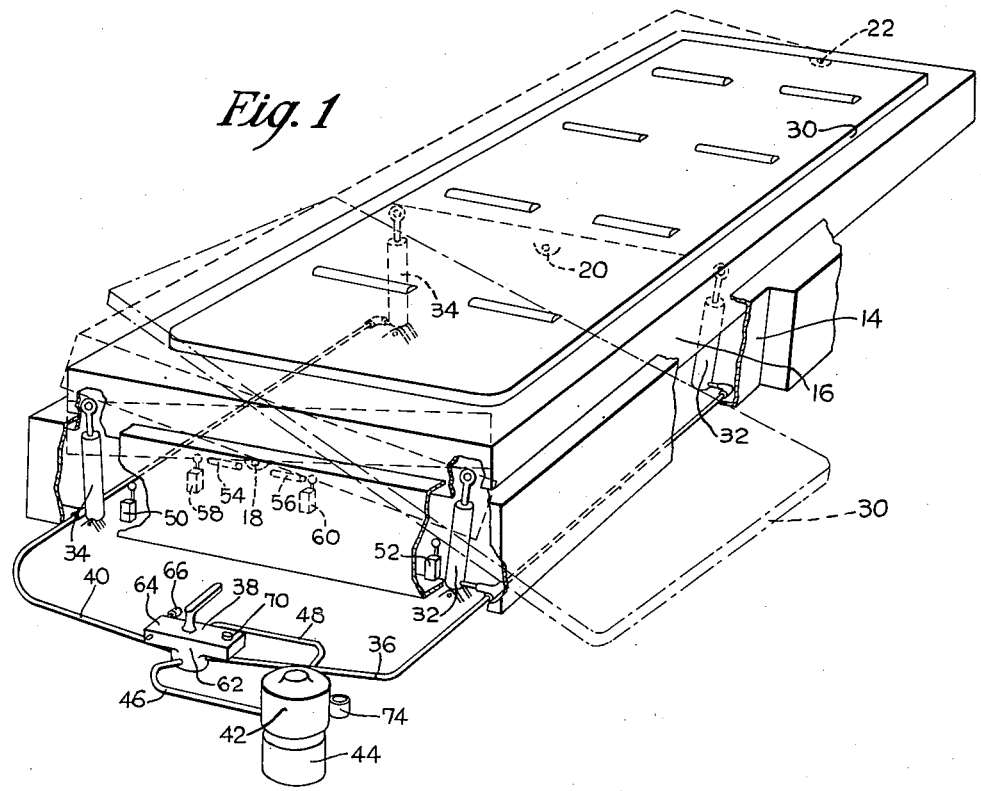
Fig. 1 is a perspective view, partly broken away, of one embodiment of the apparatus incorporating the principles of the invention.

Referring to the drawings, the numeral 10 indicates generally the frame of a vehicle, such as a funeral car, which frame carries a floor 12 in turn supporting a body floor frame 14 usually of rectangular box-like shape and open on the top. A mound 16 is received down in the top opening of the floor frame 14, the mound being pivotally supported upon a longitudinal axis and for lateral tilting or leveling action at spaced points 18, 20, and 22.

Figure 3:
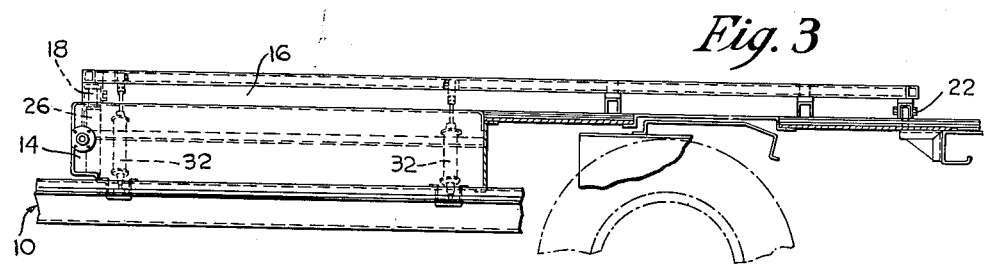
Fig. 3 is a side elevation, partially shown in section, of the apparatus of the invention.
Figure 4:
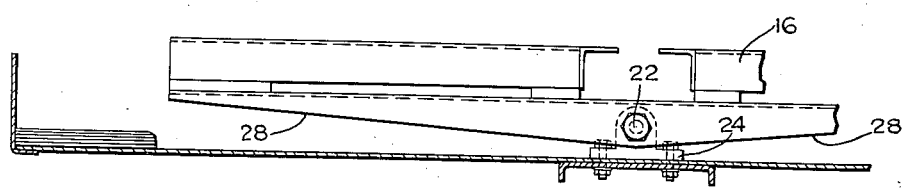
Fig. 4 is an enlarged fragmentary cross-sectional view of the vehicle frame and floor and looking forward to provide a back elevational view of the mound.

As best seen in Figs. 1 and 3, the box frame 14 is relatively deep adjacent the front half of its length, which is possible because the vehicle wheels do not interfere with it, but in the back half of the box frame it is comparatively shallow. Thus, the back pivot 22 is supported upon a relatively shallow bracket 24, whereas the center pivot 20 and the front pivot 18 are carried upon relatively high brackets 26. The bottom of the mound 16 adjacent the shallow portion of the frame 14 is upwardly inclined, as indicated at 28, so that the mound can be tilted laterally to effect the leveling action as hereinafter described.

The mound 16 is adapted to carry a table 30 which is movable from the longitudinally aligned full line position shown in Fig. 1 to a forward and laterally directed position shown in dot and dash lines in Fig. 1, this movement being achieved by a track and roller mechanism of known type and forming no part of the present invention. This movement of the table will present a casket, for example, out of a side or rear opening door in the funeral car, and with the leveling action on the mound effecting the leveling action laterally of the table and of the casket or the like carried thereby. It will be understood that the mound 16 is normally leveled before the table 30 is moved out of the side or other door of the vehicle.

A pair of hydraulic cylinders 32 are pivotally associated with one side of the bottom of the vehicle or body floor frame 14, and their piston rods are pivotally secured to the one side of the mound 16. In a like manner, a second pair of hydraulic cylinders 34 are pivotally secured between the vehicle floor or body frame and the mound at the other side thereof. These hydraulic cylinders 32 and 34 each have associated therewith an electrically actuated valve which is normally closed to lock the fluid in the cylinders, and thus lock the mound in its adjusted position, the valves being adapted to be opened electrically when fluid is to be pumped into or removed from the cylinders to reposition the mound.

An hydraulic fluid supply line 36 runs from the cylinders 32 to a control valve 38 to which is connected, also, a hydraulic fluid supply line 40 extending to the hydraulic cylinders 34. An electric motor 42 drives a fluid pump 44 which is connected by return and pressure conduits 46 and 48 to the control valve 38, with the hydraulic pump 44 functioning to pump fluid from the cylinders 34 into the cylinders 32, or vice-versa, dependent upon the direction in which the control valve 38 is thrown. The pump 44 includes an oil reservoir into which the oil is pumped by the return conduit and from the pump passes oil to the pressure conduit.

Associated with the mound 16 are a pair of limit switches 50 and 52, which are carried by the box frame 14, and which are struck by the mound near the end of its tilting travel in either direction, with the limit switches functioning to automatically shut off the motor 42 to prevent excessive movement of the mound in its leveling operation.

Carried by the mound 16 are mercury switches 54 and 56, each switch being positioned parallel to the top surface of the mound, and each switch being of the type which is open when the top surface of the mound is level, but one or the other of the switches closing as the mound is tilted in the one or the other direction.

Carried by the box frame 14, on either side of the pivot 18, and adapted one or the other to be engaged and closed when the mound begins to tilt in one direction or the other, are return switches 58 and 60.

Associated with the hydraulic valve 38 is a single pole, double throw electric switch 62 which is adapted to be operated simultaneously with the movement of the handle of the valve 38. Mounted on the side of the valve 38, but not adapted to be operated thereby, is a second single pole, double throw electric master switch 64 including an operating plunger 66. A push button switch 70, for manual operation of the system, is mounted on the other side of the valve 38, but is not adapted to be operated by the movement of the handle of the valve 38.

Having particular reference to Fig. 5 of the drawings, and completing the apparatus of the invention, is the battery 72 of the vehicle, a normally open relay 74 for completing the electric circuit to the pump motor 42 when closed, a circuit breaker 76 which automatically opens upon shorting or other overload conditions in the electrical system, a relay 78 which is normally open for completing the electric circuit to the valves of the hydraulic cylinders, and a pilot light 80 which lights when the system is ready to be operated.

In the operation of the apparatus of the invention, assuming that the vehicle is a funeral car and that it has driven to the curb or side of the road to permit loading or unloading of a casket, and assuming that because of the crown of the road or due to other circumstances, the wheels of the vehicle towards the curb or side of the road are lower than the outside wheels, then the table 30 carrying the casket will be laterally inclined. In order to effect the leveling action of the apparatus, the plunger 66 of the master switch 64 will be moved upwardly, having reference to Fig. 5 of the drawings, at which time the pilot light 80 will be lit showing that the leveling apparatus is ready to function. The circuit causing the lighting of the pilot light 80 can be readily traced on the schematic wiring diagram of Fig. 5.

Now, assuming that the right-hand side of the vehicle is low, then mercury switch 54 will be closed by the gravity flow of mercury to its contact points, and moving the handle of the hydraulic valve 38 to the left will connect the pump 44 so that it tends to pump hydraulic fluid from the hydraulic cylinders 32 into the hydraulic cylinders 34. Simultaneously with the turning of the hydraulic valve handle to the left, the electric switch 62 is closed to the left so that electric current flows from the battery 72 through the circuit breaker 76, the switch 64, limit switches 50 and 52, mercury switch 54, switch 62, back through return lead 82 and through the coil of relay 78 to the ground. The closing of relay 78 supplies electric current by way of lead 84 to the electrically opened valves 83 associated with each of the hydraulic cylinders 32 and 34 to open these valves whereby fluid can be pumped to and from the hydraulic cylinders in the manner above described.

Simultaneously, the flow of electric current back through the switch 62 and return lead 82 also energizes the coil of relay 74 to close the associated switch whereby electric current is supplied to the pump motor 42 to energize the pump 44. The operation of the pump 44 continues in the manner described with fluid being removed from the hydraulic cylinders 32 and pumped into the hydraulic cylinders 34 until such time as the mound 16 and the table 30 carried thereby move into a laterally horizontal position. As the mound 16 moves into a horizontal position, the mercury switch 54 opens and the flow of electric current to the relays 74 and 78 ceases so that the valves 83 associated with each one of the hydraulic cylinders 32 and 34 is closed to lock the mound 16 in its horizontal position, and simultaneously the flow of electric current to the motor 42 is terminated to stop the hydraulic pump 44. The side door of the funeral car is then opened and the mechanism is operated to move the table 30 from the full line position shown in Fig. 1 to the dot and dash line position shown in this figure. This movement brings the casket out in horizontal position upon the table. The locking shut of the hydraulic cylinders provides a very firm support for the over-hung table and casket in the leveled position.

It is to be noted that the leveling of the tilting of the mound 16, in the manner just described, causes at the very start of travel of the mound, the return switch 60 to close because of the edge of the mound striking it, although the return switch 58 remains open.

When the casket is removed from the table 30 the table operating mechanism is energized to return the table to its position on top of the mound, and the mound is then returned to its normally parallel position with the body frame 14 of the vehicle, and this is accomplished by throwing the lever of the hydraulic valve 38 to the right to connect the valve so that fluid will be exhausted from the hydraulic cylinders 34 and pumped into the hydraulic cylinders 32. Also, the throwing of the valve handle to the right causes the switch 62 to be closed to the right so that electric current now flows from the battery 72, through the circuit breaker 76, switch 64, switch 60, switch 62, and back through return lead 82 to energize relays 78 and 74. The energizing of relay 78 opens the valves 83 associated with the hydraulic cylinders 32 and 34, and closing the relay 74 supplies electric current to the motor 42 to drive the pump 44 to thereby remove fluid from the hydraulic cylinders 34 and return it to the cylinders 32.

During this return movement, the mercury switch 54 will close, but inasmuch as it is connected to the uncontacted pole of the switch 62, it will not in any way affect the operation of the circuit. The restoring or return movement as described will continue until the mound is back in parallel relation to the body frame 14, at which time the edge of the mound will clear the return switch 60 to cut off flow of electric current to the relays 74 and 78, thereby stopping the pump and simultaneously closing the valves 83 associated with each of the hydraulic cylinders 32 and 34. The vehicle is then ready to be driven away.

It will be understood that operation of the apparatus to level in the other direction is identical but opposite to that described. Should the vehicle be very badly tilted with the mound attempting to tilt in its leveling action beyond the limits of its normal travel, either the limit switch 50 or 52 will be opened, dependent upon the direction in which the mound is tilted, to thereby stop the tilting and leveling movement of the mound inasmuch as the limit switches 50 and 52 are in series with the mercury switches 54 and 56.

If, for some reason, it becomes advisable to manually control the tilting position of the mound, for example, to stop the mound at other than a horizontal position in a lateral direction, then the plunger 66 of the switch 64 is thrown in the opposite direction to connect the battery 72 through the circuit breaker 76 to the manual control push button 70. Closing of the push button 70 will then energize relays 74 and 78 to open the valves 83 associated with hydraulic cylinders 32 and 34 and to start the motor 42 to drive the hydraulic pump 44. Then throwing the handle of the valve 38 in one direction will tilt the mound laterally in one direction, and throwing the handle of the valve 38 in the opposite direction will cause the mound to tilt in the opposite direction. Positioning the plunger 66 of the switch 64 in neutral or middle position will shut off the pilot light 80 and the leveling apparatus.

From the foregoing it will be recognized that the various objects of my invention have been achieved by the provision of a relatively simple, inexpensive, long-lived, and substantially foolproof apparatus including a laterally tiltable mound for use with a funeral car or the like, the mound being tilted laterally by manually or automatically controlled electric-hydraulic power mechanism which is smooth and quiet in operation. Once adjusted, the mechanism is automatically locked in adjusted position to provide a very steady and positive support. The operative apparatus of the invention is substantially confined to the portion of the body frame and mound to the front of the rear wheels of the vehicle so that it does not interfere with the wheels or springing of the vehicle, and with the height of the leveling mechanism being kept to a minimum so that substantially no space in the vehicle is wasted. Moreover, positioning the control mechanism towards the front of the vehicle means that it is better adapted to resist any lateral tilting forces thrown into the mound and mechanism when the table 30 carrying a casket is moved laterally out the side door of the vehicle. The mechanism is rapid and quiet in operation, and is characterized by the smoothness and simplicity of hydraulic control.

While in accord with the patent statutes, one particular embodiment of my invention has been illustrated and described in detail, it is to be particularly understood that I am not to be limited thereto or thereby, but that the scope of my invention is defined in the appended claims.

I claim:

1. A bed leveler for funeral cars and the like comprising a rectangular box-like body floor frame open on the top, a mound received in and substantially filling the opening of the floor frame, spaced means pivotally supporting the mound for leveling movement about a central longitudinal axis, hydraulic cylinders securing opposite sides of the mound in association to the vehicle floor, an electric motor, a hydraulic pump driven by the motor, normally-closed electrically opened valves associated with the hydraulic cylinders for locking the fluid in them when adjusted, a combined hydraulic fluid valve and electric switch for simultaneously opening the electrically opened valves, starting the motor and directing the fluid from the pump to certain hydraulic cylinders and removing it from others to effect a leveling of the mound, mercury switch means for automatically shutting off the motor and opening the flow of current to the electrically opened valves to lock the hydraulic cylinders when the leveling operation is completed, and return switch means for overriding the mercury switch means when the combined valve and switch is moved in the opposite direction, said return switch means stopping the motor and closing the electrically opened valves when the mound is returned to position.

2. A bed leveler for vehicles such as funeral cars and the like comprising a mound, spaced means pivotally supporting the mound for leveling movement about a central longitudinal axis, hydraulic cylinders securing opposite sides of the mound in association to the vehicle, an electric motor, a hydraulic pump driven by the motor, normally-closed electrically opened valves associated with the hydraulic cylinders for locking the fluid in them when adjusted, a combined hydraulic fluid valve and electric switch for simultaneously opening the electrically opened valves, starting the motor and directing the fluid from the pump to certain hydraulic cylinders and removing it from others to effect a leveling of the mound, mercury switch means for automatically shutting off the motor and opening the flow of current to the electrically opened valves to lock the hydraulic cylinders when the leveling operation is completed, and return switch means in parallel to the mercury switch means to start the motor when the combined valve and switch is moved in the opposite direction, said return switch means stopping the motor and closing the electrically opened valves when the mound is returned to position.

3. A bed leveler for vehicles such as funeral cars and the like comprising a mound, spaced means pivotally supporting the mound for leveling movement about a central longitudinal axis, hydraulic cylinders securing opposite sides of the mound in association to the vehicle, an electric motor, a hydraulic pump driven by the motor, normally-closed electrically opened valves associated with the hydraulic cylinders for locking the fluid in them when adjusted, a combined hydraulic fluid valve and electric switch for simultaneously opening the electrically opened valves, starting the motor and directing the fluid from the pump to certain hydraulic cylinders and removing it from others to effect a leveling of the mound, mercury switch means for automatically shutting off the motor and opening the flow of current to the electrically opened valves to lock the hydraulic cylinders when the leveling operation is completed, and return switch means in parallel to the mercury switch means to start the motor when the combined valve and switch is moved in the opposite direction.

4. In a bed leveler for funeral cars and the like having a body supporting frame, a mound, spaced means pivotally supporting the mound in the frame for leveling movement about a central longitudinal axis, hydraulic cylinders securing opposite sides of the mound in operative association with the vehicle frame, an electric motor, a hydraulic pump driven by the motor, normally-closed electrically opened valves associated with the hydraulic cylinders for locking the fluid in them when adjusted, and a manually controlled combined hydraulic fluid valve and electric switch for simultaneously opening the electrically opened valves, for closing the circuit to start the motor and directing the fluid from the pump to certain hydraulic cylinders and removing it from others to effect a leveling of the mound.

5. In a bed leveler as in claim 4, means associated with the combined hydraulic fluid valve and electric switch for closing a circuit to the motor to return the mound to a tilted position, and means for shutting off the motor when the mound is returned to its original tilted position.

6. A bed leveler for funeral cars and the like comprising a substantially rectangular box-like body floor frame open on the top, a mound received in and substantially filling the opening of the floor frame, spaced means pivotally supporting the mound in the frame for leveling movement about a central longitudinal axis, hydraulic cylinders securing opposite sides of the mound in association to the vehicle floor, an electric motor, a hydraulic pump driven by the motor, normally-closed electrically opened valves associated with the hydraulic cylinders for locking the fluid in them when adjusted, and a combined hydraulic fluid valve and electric switch for simultaneously opening the electrically opened valves, starting the motor and directing the fluid from the pump to certain hydraulic cylinders and removing it from others to effect a leveling of the mound.

7. A leveler for funeral cars comprising a mound pivotally supported on a relatively short bracket at its back end and a relatively high bracket at its front end, a body floor frame surrounding the mound and being relatively shallow over approximately the back half of the mound adjacent the car rear wheels and deeper over approximately the front half of the mound, and electric-hydraulic control means for the mound received in the deeper portion of the body floor frame.

8. In a funeral car or the like, a substantially rectangular box-like body floor frame open on the top, a mound received in and substantially filling the opening of the floor frame, spaced means pivotally supporting the mound for leveling movement about a central longitudinal axis, hydraulic means for controlling the tilting position of the mound, pressure means for introducing or removing fluid under pressure to the hydraulic means, and manually controlled means for initiating and stopping the operation of the pressure means.

ELTON L. BURNETT.

REFERENCES CITED

The following references are of record in the file of this patent:

UNITED STATES PATENTS

| Number | Name | Date |
| --- | --- | --- |
| Re. 20,710 | Richter et al. | Apr. 26, 1938 |
| 2,085,043 | Richter | June 29, 1937 |
| 2,268,017 | Busick, Jr., et al. | Dec. 30, 1941 |
| 2,324,587 | Krogh | July 20, 1943 |
| 2,359,961 | Anthony | Oct. 10, 1944 |
| 2,472,944 | Furer et al. | June 14, 1949 |
| 2,537,572 | Cole | Jan. 9, 1951 |